March 6, 1951     J. W. JEWELL ET AL     2,543,974
METHOD FOR SYNTHESIS OF ORGANIC COMPOUNDS
Filed July 21, 1947
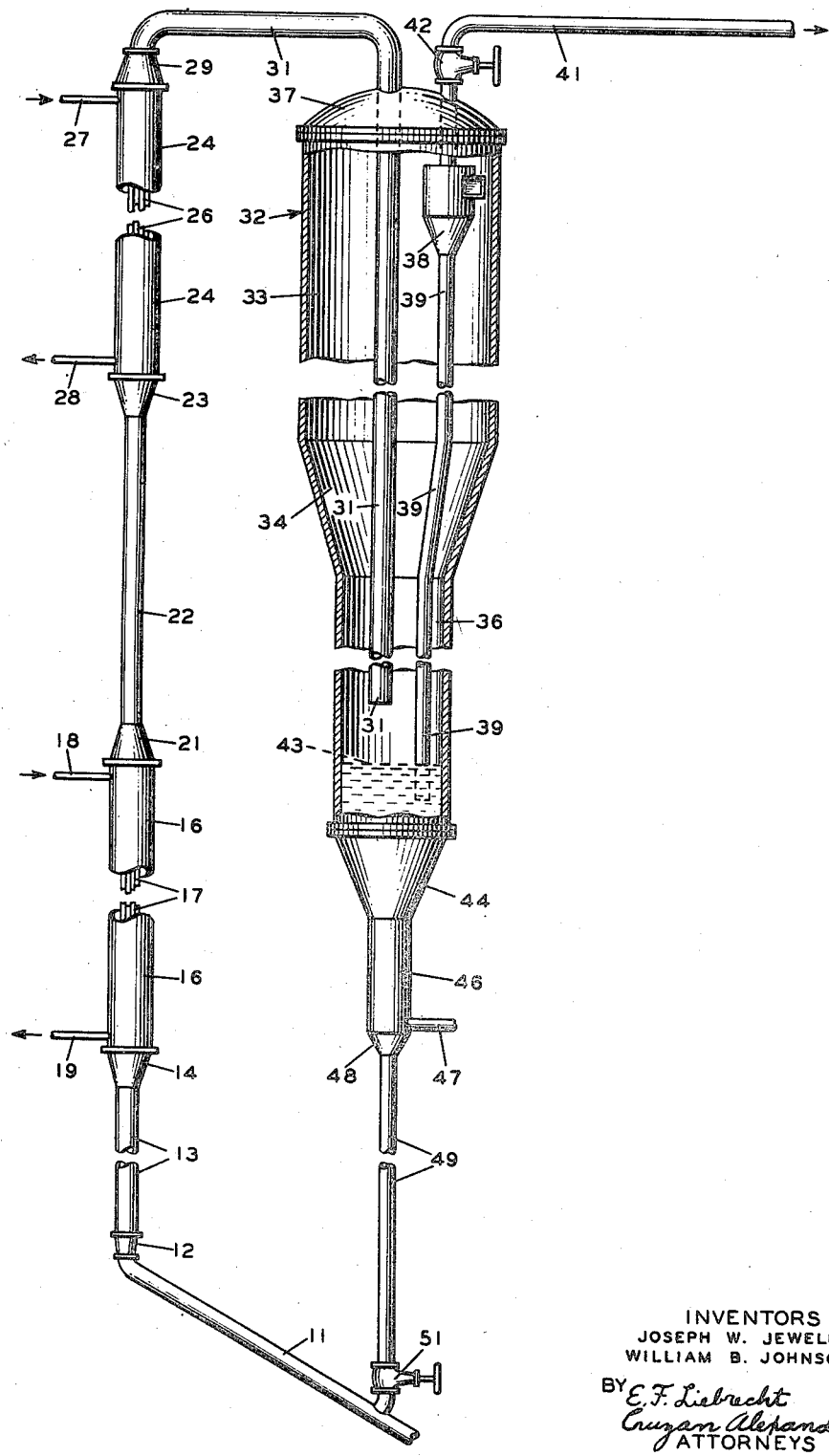
INVENTORS
JOSEPH W. JEWELL
WILLIAM B. JOHNSON
BY E. F. Liebrecht
Cruzan Alexander
ATTORNEYS Patented Mar. 6, 1951

2,543,974

UNITED STATES PATENT OFFICE 2,543,974

METHOD FOR SYNTHESIS OF ORGANIC COMPOUNDS

Joseph W. Jewell, Summit, and William B. Johnson, Far Hills, N. J., assignors to The M. W. Kellogg Company, Jersey City, N. J., a corporation of Delaware Application July 21, 1947, Serial No. 762,250

15 Claims. (Cl. 260—449.6)

This invention relates to an improved method and apparatus for hydrogenating carbon oxides to produce organic compounds. Primarily the improved process involves reacting hydrogen and carbon monoxide under highly efficient conditions to produce hydrocarbons and/or oxygenated organic compounds. The improved process is applicable also in reacting hydrogen with other organic compounds containing the carbonyl group, and herein designated as "carbon oxides," whose reaction with hydrogen is promoted by the catalysts which are effective with carbon monoxide, such as carbon dioxide, ketones, aldehydes, acyl halides, organic acids and their salts and esters, acid anhydrides, and amines. In the following description of the invention the hydrogenation of carbon monoxide will be referred to specifically. It will be understood, however, that the invention is of wider application, including within its scope the hydrogenation of any suitable carbon oxide.

It has been known for some time that hydrogen and carbon monoxide may be made to react exothermically in the presence of certain catalysts and under specific reaction conditions to form hydrocarbons having more than one carbon atom per molecule and oxygenated organic compounds. In general, the synthesis of hydrocarbons by the hydrogenation of carbon monoxide is accomplished in the presence of a metal or an oxide of a metal, such as one chosen from group VIII of the periodic table, as a catalyst at pressures below about 500 pounds per square inch gage and at temperatures below about 750° F.

Various methods have been practiced to effect the reaction of hydrogen and carbon monoxide to produce organic compounds. Among these methods are those known as fixed-bed catalyst operations and fluid-bed catalyst operations. The fixed-bed operation comprises passing a reaction mixture of hydrogen and carbon monoxide through a stationary bed of catalyst in a reaction zone, and the fluid-bed operation comprises passing a reaction mixture through a finely divided catalyst mass suspended in the reaction mixture in the reaction zone under conditions such that a so-called pseudo-liquid dense phase of solids is formed. Characteristically, certain reaction conditions are necessary for each of these processes and for the particular catalyst used.

The synthesis feed gas or reaction mixture comprises a mixture of about 1 to 5 mols of hydrogen per mol of carbon monoxide and may be prepared by various means including the catalytic conversion of natural gas, steam, and carbon dioxide.

The most recent development in the synthesis of organic compounds from hydrogen and carbon monoxide has been in the fluid-bed type operation. This type of operation has had several apparent advantages over the fixed-bed operation and has yielded organic compounds of high quality and in larger quantity per pound of catalyst. In such a fluid-bed operating at a temperature of about 600° F. and at super-atmospheric pressures using a fluidized iron catalyst, a contraction of reacting gases of about 41 per cent to about 70 per cent and a carbon monoxide disappearance of about 85 per cent to about 100 per cent have been observed. The selectivity of the reaction is dependent on the concentration of reactants but with relatively low $H_2:CO$ ratio about 25 to about 40 per cent of the CO is converted to $CO_2$, and oil and water yields of about 100 to 130 cc. per cubic meter of fresh feed and about 60 to 120 cc. per cubic meter of fresh feed, respectively, are obtainable.

Even in view of the relatively good results obtained by the fluid-bed type operation, certain inherent disadvantages have been found. In such fluid-bed operations in which the catalyst is suspended in the reaction mixture to form a pseudo-liquid dense phase of solids, classification of the solids often occurs causing partial deaeration of the catalyst bed and channeling of gas. There is also a tendency for the fluid-bed to settle after extended use of the catalyst as a result of the agglomeration of the catalyst particles caused by the presence of relatively high molecular weight organic compounds and carbonaceous deposits accumulating on the catalyst particles. This accumulation of such deposits on the catalyst also reduces the available active surface and consequently the conversion. It also reduces the density of the catalyst mass thereby requiring a greater volume for the same weight of catalyst.

Considerable difficulty is also encountered in the removal of the exothermic heat of reaction from the fluid bed. The rate of reaction in the hydrogenation of carbon monoxide varies with temperature and there is considerable change in the product distribution in the higher range of operating temperatures as compared to the lower range of operating temperatures. The lower range of operating temperatures is more favorable to the production of higher-boiling products which have a tendency to condense on the catalyst particles. The condensed material on the catalyst particles may cause agglomeration and is potential coke, and, if the temperature increases above certain limits within the reaction zone, the formation of coke upon the catalyst particles is accelerated. Temperatures low enough to condense the relatively high-boiling products, and temperatures high enough to coke the condensed material can often occur in different parts of the fluid-bed. In a reactor with the fluid-bed of catalyst on the outside of the cooling tubes, the design space between the tubes must be made such that the catalyst particles will not be cooled below the minimum allowable temperature or such that the catalyst particles will not be heated to an excessive temperature at any particular time. However, to insure cooling and at the same time to prevent overcooling of the catalyst, the tube spacing must be as close as mechanically practical and the coolant temperature must closely approach the catalyst bed temperature. Such a design obviously results in an expensive unit. On the other hand, if the fluid-bed of catalyst is inside the tubes, a velocity which will permit internal recycling or fluid-bed operation within the tubes will result in such a low-velocity in the zones under and above the tube sheet that the residence time of the reactants is excessive and overheating results. The overheating causes coke formation. It is desirable, therefore, to design or provide a system to overcome the tendency of overcooling or overheating fluid-bed systems.

Another inherent disadvantage of fluid-bed operation is the fact that the catalyst concentration in the fluid-bed cannot be controlled to any great extent since a considerable change in the gas feed volume is required to change the catalyst concentration in the fluid-bed. Changes in the fluid-bed concentration may occur but usually do not occur at will but occur as a result of accumulations of deposits thereon or from local partial deaeration.

Still a further disadvantage of the fluid-bed technique is the fact that the catalyst is retained in the fluid-bed for an extended and prolonged length of time. If a portion of the catalyst is continuously or intermittently withdrawn for cooling and regeneration purposes, it follows that a portion remains in the fluid bed in the reaction zone almost permanently. The prolonged residence time of the catalyst in the reaction zone results in considerable deactivation and changes in density of the catalyst as a result of such factors as the accumulation of carbonaceous deposits thereon, etc. Another disadvantage of uncontrolled residence time is that the high rate of accumulation of deposits on the catalyst limits the ratio of $H_2:CO$ to uneconomically high ratios. It is, therefore, much to be desired to provide a synthesis reactor and process in which the gas residence time, the catalyst residence time, and the temperature of reaction are under full and positive control.

It is an object of this invention to provide a process for preventing or minimizing the above difficulties encountered with fluid-bed synthesis operations.

It is an object of this invention to provide a process and apparatus for effecting exothermic reactions.

It is another object of this invention to produce hydrocarbons and/or oxygenated organic compounds by the interaction of a carbon oxide and hydrogen in the presence of a catalyst.

Another object of this invention is to provide an improvement in the synthesis of hydrocarbons from hydrogen and carbon monoxide in the presence of a finely-divided fluidized catalyst.

Still a further object is to provide a method for the synthesis of hydrocarbons using a relatively low feed ratio of hydrogen to carbon monoxide.

Still another object is to provide a fluidized process for the hydrogenation of carbon monoxide in which the catalyst life is extended and prolonged.

Another object is to provide an effective catalyst stripping zone to remove the accumulation of high molecular weight organic compounds before the catalyst contacts fresh feed gas.

Yet another object is to provide a positive mixing zone where relatively cold feed gas can be contacted with relatively hot catalyst and insure preheat of the gas to the reaction temperature.

Various other objects and advantages will become apparent to those skilled in the art from the accompanying description and disclosure.

The process of this invention provides a method for controlling the residence time of a finely-divided fluidized hydrogenation catalyst in a reaction zone for the hydrogenation of a carbon oxide. According to this invention a gaseous mixture comprising hydrogen and a carbon oxide and containing a finely-divided hydrogenation catalyst is passed through a reaction zone at a sufficiently high velocity under conditions such that even the heaviest catalyst particles are carried through the reaction zone with the gaseous mixture. The operation of the present process is such that all of the catalyst particles are continuously moved in the direction of flow of the gases through the reaction zone by entrainment in contrast to being held in suspension in a pseudo-liquid dense phase of solids according to conventional operations. In the conventional operation in which the suspended solids form a so-called pseudo-liquid dense phase, the finely divided solid particles are in a turbulent condition and are circulated or recycled within the dense phase itself. If any of the heavier particles in dense phase operation are circulated through the reaction zone, they are done so only by virtue of the bumping effect of the lighter particles which force the heavier particles through the reaction zone and the residence of such particles is indefinite.

In order to achieve continuous circulation of the catalyst particles through the reaction zone by entrainment in accordance with the teachings of this invention, a velocity above about 6 feet per second must be used, preferably, the velocity is above 10 feet per second and may be as high as 40 feet per second or higher. The actual velocity will depend upon the chemical and physical properties of the finely divided solid material and also upon the size of the solid particles. When a continuous catalyst phase of circulating catalyst particles is formed at the velocities described in accordance with this invention, the concentration of the finely divided catalytic material in the reaction zone is generally below about 18 pounds per cubic foot of gas at operating conditions of temperature and pressure. The residence time of the gaseous reactants and conversion products in the reaction zone should be sufficient to obtain the optimum yield of hydrocarbons and/or oxygenated organic compounds. The residence time of the catalyst may vary to a considerable extent and at very high velocities may be substantially the same as the residence time of the gases and reactants; however, the residence time of the catalyst is comparatively short with regard to fluid-bed operations, being a matter of seconds with the present operation, as compared to a matter of minutes or hours with fluid-bed operations and is under operating control over a very considerable range.

When a continuous catalyst phase of circulating catalyst particles is formed at the velocities described in accordance with this invention, the concentration of the finely divided catalytic material in the reaction zone is a function of actual velocity and characteristics of the vapor (such as density and viscosity) and is also a function of the average size, range of size, and physical characteristics of the catalyst and will vary between the catalyst loading rate and several (4–8) times the loading rate. By variation in cross section of the reaction zone in different sections thereof, the relative concentration of catalyst may be varied in such sections. By varying the loading rate of the catalyst to any particular high velocity section of the circuit, the concentrations of catalyst in that section may be controlled. At any given fresh feed rate the concentration of catalyst may be varied by using more or less recycle vapor to change the velocity within the limits of the particular design.

In conventional fluid-bed type operations the finely divided catalyst forms a so-called pseudo-liquid dense phase of catalyst in the reaction zone. The velocity of the gas stream passing through the pseudo-liquid dense phase of catalyst is sufficiently low to maintain the catalyst mass in the so-called dense fluidized condition and yet sufficiently high to maintain the finely divided catalyst in a turbulent condition in the dense phase. In this condition the catalyst mass may be said to be suspended in the gas stream but not entrained therein in the sense that there is continuous movement of the finely divided catalyst particles in the direction of flow of the gas stream. In the fluid-bed type operation a small proportion of the finely divided catalyst in the fluidized mass may become entrained in the gas stream emerging from the upper surface of the fluidized mass. Actually, therefore, two phases are formed in the reaction zone; a dense pseudo-liquid catalyst phase in the lower portion of the reaction zone, and a dilute catalyst phase in the upper portion of the reaction zone. The concentration of the catalyst in the so-called dense phase is usually at least about 25 pounds per cubic foot of gas and generally between about 50 and about 120 pounds per cubic foot of gas. The amount of catalyst in the so-called dilute phase is generally less than about 0.01 pound per cubic foot of gas.

The catalyst employed in the present invention is a finely-divided powdered catalyst of a metal or metal oxide which is or becomes in the reaction zone a catalyst for the hydrogenating reaction. Finely-divided metallic iron or iron oxide or a mixture of metallic iron and iron oxide are an example of the catalyst employed in this invention. Preferably, a metallic iron catalyst is used in the finely-divided form. Other metals and metal oxides may be employed which are effective in catalyzing the hydrogenation of carbon monoxide, such as cobalt, nickel, and other metals of group VIII of the periodic table. While the catalyst powder usually consists of such catalytic metals or their oxides, it may also include a minor amount of promoting ingredients, such as alkalies, alumina, silica, titania, thoria, manganese oxide, and magnesia. Also, the catalyst may be supported on a suitable support, such as a bentonite type clay, "Super Filtrol," silica gel, alumina, and mixtures of these supports. In the following description, catalyst powders consisting of a metal and/or a metal oxide and containing at most a minor proportion of promoters are referred to as finely-divided metal hydrogenation catalyst.

The exact chemical condition of the catalyst in its most active form is not certain. It may be that the active form is present when the metal is at an optimum degree of oxidation and/or carburization; consequently, a metallic iron catalyst which is in a reduced condition when first contacted with the reactants may reach its state of highest activity through being oxidized and/or carburized in the reaction zone. Therefore, in this specification and claims, the catalyst employed is described by reference to its chemical composition when first contacted with the reactants.

The catalyst is employed in a fine state of subdivision. Preferably, the powdered catalyst initially contains no more than a minor proportion by weight of material whose average particle diameter is greater than 250 microns. The greater proportion of the catalyst mass, preferably, comprises a material whose average particle diameter is smaller than 100 microns including at least 25 weight per cent of the material in a particle size smaller than 40 microns. An example of a desirable powdered catalyst is one which comprises at least 75 per cent by weight of material smaller than 150 microns and at least 25 per cent by weight of materials smaller than 40 microns.

The temperature of reaction for the hydrogenation of carbon monoxide is generally between about 300° F. and about 750° F. With a metallic iron catalyst, temperatures between 450° F. and 750° F. are usually employed. With a cobalt catalyst usually a temperature below 450° F. is sufficient for the hydrogenating reaction. However, within the broad range of temperatures it is a necessity to maintain the temperature within a close range, at some level, for optimum selectivity for any given reaction and a change in temperature may be desirable as the concentration of reactants changes, etc. Pressures employed are somewhat above atmospheric and range from about 10 pounds to as much as 500 pounds per square inch gage, preferably between about 80 pounds and about 300 pounds per square inch gage.

In effecting the reaction it may often become necessary to cool the reaction zone to maintain the relatively constant temperature necessary. Various methods of cooling the reaction zone itself, such as by external cooling means or by injection of a cooling medium, such as a vaporizable liquid or a gas, directly into the reaction mixture, may be practiced without departing from the scope of this invention. Furthermore, it may often become necessary to preheat the reaction mixture prior to entry into the reaction zone, and also the catalyst may be preheated before introduction in the reaction mixture. However, the cooling and preheating are factors which will be characteristic of the particular apparatus being used and the particular conditions under which the reaction is effected.

According to a preferred embodiment of this invention, a fresh feed gas having a hydrogen to carbon monoxide ratio higher than the ratio in which these compounds are converted to other compounds is employed and the ratio of hydrogen to carbon monoxide in the reaction zone itself may be increased above the ratio in the fresh feed gas and to a desired value by recycling a portion of the unconverted gas from the reaction zone, after removal of a part or all of the normally liquid product by condensation. A ratio of hydrogen to carbon monoxide in the fresh feed gas is used in which only a portion of the hydrogen is converted to products of the process. A portion of the effluent after removal of the major proportion of the liquid product is recycled to the reaction zone in a volumetric ratio of recycle to fresh feed gas of about 0.5:1 to about 10:1, generally about 1:1 to about 5:1 or 6:1. However, depending on the character of the available feed gas or on the character of the desired product, it may or may not be desirable to recycle the noncondensed portion of the reaction effluent.

For efficient operation it is usually desirable to have a higher ratio of $H_2$:CO in the fresh feed than the ratio of consumption in the reactor. This insures sufficient surplus $H_2$ to permit increasing the concentration by recycling which in turn insures the ability to attain economic conversion of the CO. The liability to accumulation of deposits on the catalyst which is characteristic of the fluid bed reactor is seriously aggravated by low $H_2$:CO ratios in the reactor feed, necessitating high recycle rates which sharply increase the cost of the equipment and the operation. The ratio of hydrogen to carbon monoxide in the reactor feed is usually about 1:1 to about 3:1 and according to this process may be maintained at about 1:1 without detrimental effect on the synthesis reaction. The ratio of hydrogen to carbon monoxide in the fresh feed itself may be considerably lower than in the reaction zone or total feed and may range from about 1:1 to about 2:1 at relatively low conversions per pass.

The linear velocity of the gaseous reaction mixture passing upward through the reaction zone is conveniently expressed in terms of superficial velocity, which is the linear velocity the feed stream would assume if passed through the reactor in the absence of catalyst, and takes into account the shrinkage in volume caused by the hydrogenation reaction.

The concentration of the catalyst in the gaseous reaction mixture in the reaction zone is usually less than about 18 pounds per cubic foot of gas at operating conditions, and at the preferred operating conditions may be between about 1 pound and about 12 pounds per cubic foot. The actual concentration required in the above range will depend to a certain extent upon the amount of inert gas in the reaction zone and also upon the accumulation of carbon and wax on the catalyst particles as the operation proceeds. The accumulation of wax and carbon on the catalyst decreases the particle density and hence the weight of catalyst per cubic foot of gas at any given velocity. The above values represent the usual limits but the values may vary in accordance with the character of the catalyst and operating conditions.

Although the invention has been described with reference to an upward-flowing gaseous stream of reactants and catalyst, it should be understood that the catalyst and reactants may flow together downward, horizontally, or even angularly, through a reaction zone without departing from the scope of this invention. It has been found that by upward flowing of gas through a substantially vertical reaction zone the weight of catalyst per cubic foot of gas and the residence time of the catalyst can be controlled conveniently and accurately and for that reason is the preferable method of operation. It should be understood that the reaction continues in the down-flow operations although the catalyst concentration is less.

In operating a synthesis process under set conditions within the limits of this invention with an iron catalyst and at a temperature between about 550° F. and about 650° F. at relatively low superatmospheric pressures, a contraction of the catalyst gas of about 25 to about 85 per cent has been observed. The carbon monoxide disappearance is about 70 per cent to about 88 per cent and the selectivity of the reaction illustrated by the conversion of carbon monoxide to carbon dioxide is about 15 per cent to about 30 per cent. Condensed oil and water yields of about 30 to about 100 and about 80 to about 175 ccs. per cubic meter of fresh feed gas, respectively, are obtained by operating according to the present process and may contain appreciable quantities of organic chemicals.

The invention will be described further by reference to the accompanying drawing which is a view in elevation partly in cross section diagrammatically illustrating apparatus for effecting the hydrogenation of a carbon oxide according to the present invention for a minimum capacity of 19,000 standard cubic feet of gas per hour and for a minimum velocity of 7 feet per second at reaction conditions in the vertical upflow section of the equipment.

In the drawing a synthesis feed gas comprising hydrogen and carbon monoxide present in a ratio of about 2:1 is introduced into conduit 11. In conduit 11 the gas stream picks up finely divided hydrogenation catalyst, such as reduced iron, from standpipe 49. Conduit 11 is a standard 2 inch steel pipe and is about 2½ feet in length from the point of introduction of the catalyst. The catalyst loading into conduit 11 is regulated by a conventional slide valve 51. At the minimum velocity of about 28 feet per second in conduit 11, intimate mixing of finely divided catalyst and reactants is achieved and reaction is effected immediately. In order to prevent overheating of the reaction mixture in conduit 11 as the result of the liberation of the exothermic heat of reaction therein, the residence time of the reactants between the catalyst introduction and the first cooler should be less than about 2 seconds, preferably at the minimum velocity about 1.5 seconds, for relatively high CO concentrations, such as above 30 per cent. While the hydrogenation of the carbon oxide is progressing in conduit 11, the gaseous mixture of reactants and products of reaction are passed to a first cooler 16 through a standard 4 to 2 inch reducer 12 and a standard 4 inch diameter pipe 13. Standard 4 inch diameter pipe 13 provides a minimum velocity of about 7 feet per second at reaction conditions for the design capacity of 19,000 standard cubic feet of passing through per hour. Cooler 16 comprises a cylindrical shell surrounding a bundle of seven standard one inch diameter pipes 17. Pipes 17 are held in place by tube sheets (not shown) at each end of cooler 16. Cooler 13 is connected to conduit 13 by means of a standard reducing fitting 14 and to a conduit 22 by a reducing fitting 21. Reducer 12, conduit 13, and fitting 14 together are about 10 feet 8 inches in length. Cooler 16 is approximately 12 feet in length. A cooling liquid, such as Dowtherm or other suitable coolant, is introduced into the annular space between tubes 17 and the shell of cooler 16 by means of inlet conduit 18, or the equipment may be arranged as a boiler in which the flow of coolant is preferentially upward. The cooling medium flows downward in indirect contact with the upward flowing gaseous reaction mixture in tubes 17 and is removed from the lower portion of cooler 16 by means of outlet conduit 19. Prior to entry into cooler 16 the gaseous reaction mixture is at the maximum temperature desired, about 600° F. While the reaction proceeds in cooler 16 the rate of heat removal is in excess of the rate of heat release due to reaction; the reaction mixture leaves the cooler at a desired lower temperature, about 590° F. The linear gas velocity in cooler 16 is greater than the linear gas velocity in conduit 13 and is usually above about 24 feet per second. A cooled reaction mixture at a temperature of about 590° F. and containing entrained catalyst is passed from cooler 16 through reducer 21 into a standard 4 inch diameter pipe 22 in which pipe the reaction proceeds. The length of conduit 22 is such with regard to the velocity of the gaseous stream therein that the temperature of reaction will not rise above the maximum temperature desired before entering a second cooler 24. Conduit 22 may contain a restricted section of about 2 inches in diameter to aid in mixing the catalyst and gases. In the present design the length of conduit 22 including reducing fittings 21 and 23 is about 7 feet 8 inches. At the outlet of conduit 22 the temperature of the gaseous reaction mixture is about 600° F. The gaseous mixture is introduced into the second cooler 24 through reducing fitting 23. Cooler 24 is similar to cooler 16 and comprises a cylindrical shell surrounding a bundle of tubes 26 through which the gaseous reaction mixture and entrained catalyst flow. A cooling medium is introduced into the annular space between tubes 26 and the cylindrical shell of cooler 24 by means of inlet conduit 27. Cooling medium passes countercurrently and in indirect heat exchange with the flowing gaseous mixture in tubes 26. The cooling medium is removed from cooler 24 through outlet conduit 28. Cooler 24 is approximately 12 feet in length. The reaction mixture in cooler 24 is cooled from about 600° F. to an outlet temperature of about 590° F. The cooled reaction mixture containing entrained catalyst is removed from cooler 24 and passed through a standard reducing fitting 29, a standard 4 inch pipe 31, into catalyst separator 32. The gaseous mixture in conduit 31 achieves a temperature of about 620° F. before discharging into separator 32. This relatively high temperature aids in stripping some of the unvaporized product components from the catalyst. The total length of conduit 31 is about 25 feet. The horizontal section of conduit 31 may be of a smaller diameter than the vertical section, for example about 2 inches in diameter, in order to minimize or prevent the tendency of the catalyst to settle in the horizontal section.

Coolers 16 and 24 may be independently operated such that the reaction effluent may be cooled to different outlet temperatures. The outlet temperature of the reaction effluent from cooler 16 may be lower than the outlet temperature from cooler 24; and, vice versa, the outlet temperature from cooler 16 may be higher than the outlet temperature from cooler 24 without departing from the scope of this invention. Conveniently, the cooling medium from conduits 19 and 28 and coolers 16 and 24, respectively, may be passed to a common cooling unit (not shown) comprising a conventional indirect heat exchange unit. After cooling of the cooling medium, the cooling medium may be passed to an accumulator (not shown) and from there recycled back to coolers 16 and 24 through conduits 18 and 27, respectively. Alternatively, coolers 16 and 24 may be independently operated with separate cooling means for cooling the cooling medium and with separate accumulators. Although countercurrent heat exchange with the reaction mixture has been shown and described, concurrent heat exchange may be employed without departing from the scope of this invention.

Separator 32 comprises an upper enlarged cylindrical section 33, an intermediate conical section 34, a lower, preferably cylindrical, section 36 and a top 37. Enlarged section 33 comprises a standard 24 inch pipe in which section a larger proportion of the catalyst is separated from the reaction effluent. Lower section 36 comprises a standard 10 inch pipe and constitutes an accumulation zone for separated catalyst. A catalyst bed is maintained in accumulator or lower section 36 at a level indicated by numeral 43. Conduit 31 preferably terminates above or adjacent to level 43 such that the effluent gases issuing therefrom cause a highly turbulent action in the catalyst bed in accumulator 36. This turbulent action caused by the effluent gases from conduit 31 prevents bridging or caking of the catalyst in the accumulation zone 36, which caking or bridging would hinder the flow of the catalyst downward into stripping section 46. A conventional cyclone separator 38 is positioned inside enlarged section 33. Gases containing finely divided entrained catalyst pass into cyclone separator 38 wherein the finely divided entrained catalyst is separated from the gases. Catalyst passes from cyclone separator 38 downward through a standpipe 39 into the lower portion of accumulator 36. Standpipe 39 comprises a ¾ inch standard pipe and terminates below the bed level 43. Gases substantially free from entrained solids are removed from cyclone separator 38 through conduit 41 and gate valve 42. Conduit 41 is a standard 1½ inch steel pipe.

Catalyst which has separated from the gaseous effluent is passed to a stripping section 46 by means of a standard reducer 44. Stripping section 46 comprises a standard 2½ inch steel pipe approximately 2 feet in length. A stripping gas, such as hydrogen, carbon dioxide, steam or recycle gas, is introduced into stripping section 46 through conduit 47. The stripped finely divided catalyst is passed from stripping section 46 by means of a standard reducer 48 into a standpipe 49 comprising a 2 inch standard pipe. A standard 2 inch slide valve 51 is provided in the lower portion of standpipe 49 to regulate the flow of catalyst into conduit 11.

Cold synthesis gas and/or recycle gas may be injected into conduit 22 and/or into conduit 31 without departing from the scope of this invention. The injection of such gases into the reaction section of the apparatus aids in controlling the temperature of reaction and also aids in controlling the composition of the reaction effluent with regard to hydrogen, carbon monoxide, and diluent gases.

The gaseous effluent comprising the products of the hydrogenation reaction and unreacted hydrogen and/or carbon monoxide is passed through conduit 41 to conventional separation units (not shown) for the separation of the products of the process from the effluent. Unreacted reactants recovered in the separation unit may be recycled to conduit 11, if desired.

With regard to temperature, using a high velocity system, as shown, the cooling surface is swept clean of catalyst particles with the result that none of the catalyst has sufficient time of contact to overcool, and with the result that the cooling surface is more efficient. The relatively clean cooling surface permits using a lower temperature coolant without danger of overcooling the catalyst as with conventional fluid-bed operations. Furthermore, with temperatures under full control the design minimum and maximum operating temperatures can safely cover a relatively wide range without local excessive deviation from the permissible range of temperatures.

The system is also much more flexible than conventional fluid-bed systems because the catalyst feed rate and the coolant flow rate can be changed independently. No preheating is required of the synthesis gas in most instances since the mixing of the reactants and catalyst at the catalyst pick-up is so efficient that all of the gases come to the theoretical mixing temperature almost instantaneously.

The multi-stage cooling of the apparatus shown has several distinct advantages. By multi-stage cooling in a high velocity system, the temperature range through the reaction zone can be kept relatively closer to an average or can be varied at will. The divided capacity of the catalyst coolers also makes it possible for fixed tube sheet bundles to be employed, which results in a decrease in cost of apparatus. The conical sections into and out of the coolers are highly efficient mixers at the velocities of the present process and are, therefore, ideal reaction zones for the most efficient utilization of the catalyst.

The catalyst concentration in the reaction zone, such as in conduits 11, 22, and 31 may be accurately controlled according to this process by varying the catalyst loading rates through slide valve 51. The concentration is a function of both the velocity and the loading rate, except at the higher velocities within range disclosed when the concentration is a function primarily of the loading rate.

Still another advantage of the present system is the fact that the accumulation of unvolatilized organic compounds of relatively high molecular weight, such as heavy polymers, on the catalyst, which compounds are potential coke, can be minimized by stripping the circulating catalyst in stripper 46. Since the catalyst has a relatively short residence time in the reaction zone in which it contacts the hydrogen and carbon monoxide, the wax deposits thereon may be stripped before the accumulations become excessive and before coke is formed. The catalyst is in the reaction zone in the present system only a matter of seconds before it is withdrawn, separated from the reactants and reaction products, and then stripped of wax deposits. After stripping, the catalyst is again returned to the reaction zone. The intermediate stripping operation maintains the catalyst at its maximum activity and results in substantially prolonged life of the catalyst. The combination of short residence time and stripping enables the operation of the process without frequent intermittent or continuous regeneration of the catalyst by oxidation and/or reduction. The process may be operated for prolonged periods with substantially the sole source of catalyst to the reaction zone being the stripped recycle catalyst. A small amount of fresh catalyst may be added to the system to compensate for the loss of catalyst with the reaction effluent, such as through line 47.

Various minor modifications and alterations of the apparatus shown in the drawing may be practiced by those skilled in the art without departing from the scope of this invention. Various coolers, condensers, distillation units, and other means for treating the reaction effluent have not been shown for a matter of convenience and simplicity but their presence and use will be obvious to those skilled in the art.

The following example is offered as a means of better understanding the application of the present invention to the hydrogenation of carbon monoxide and the specific recitation of certain limitations therein is not considered unnecessarily limiting to the present invention.

EXAMPLE

In this example an iron catalyst was employed, which iron catalyst was prepared by fusing and reducing Alan Wood Ore. The catalyst contains metallic iron, alumina, titanium dioxide, and silica, and about 1.2 to about 1.4 weight per cent potassium calculated as the oxide added prior to fusion. The particle size of the catalyst employed in the runs of this example is shown in Table I below:

Table I

POWDERED IRON CATALYST PARTICLE SIZE

| Screen Analysis | Weight Per Cent |
|---|---|
| Mesh | |
| +40 | ---------- |
| 40/100 | 2.5 |
| 100/200 | 5.1 |
| 200/Pan | 13.2 |
|  | 79.2 |
|  | 100.0 |
| Roller Analysis | |
| Microns | |
| 0-10 | 16.2 |
| 10-20 | 17.0 |
| 20-40 | 19.2 |
| 40-60 | 24.0 |
| 60+ | 23.6 |

Recovery, per cent, 98.8.
Density (basis water), 6.8.

Having prepared a catalyst of the desired properties and the required size, the catalyst was introduced into a conduit, similar to conduit 11 of the drawing, in which a mixture of hydrogen and carbon monoxide was flowing upward at a relatively high velocity. The conditions of reaction and the analysis of the product is shown in Table II below. In obtaining data various gas velocities as well as concentrations of catalyst in the reaction zone were used to determine their effect on the reaction and product. Also, it will be noted that the pressures used varied from 80 to 250 pounds per square inch gage. The reaction effluent and entrained catalyst were withdrawn from the reaction zone after a relatively short residence time therein. The catalyst separated by gravity from the effluent in an enlarged section of the apparatus, such as separator 32 of the drawing, and passed by means of a standpipe, such as conduit 49 of the drawing, to the point of introduction of the catalyst into the synthesis gas stream. The effluent passed through filters to separate fine catalyst therefrom. The filters were cleaned intermittently or continuously by flowing recycle gas back through them. The effluent then passed through a condenser at about 40° F. and at operating pressure and uncondensed gases were recycled to a point just before the first contact of catalyst and synthesis gas.

Catalyst in the standpipe was maintained at about 600° F. by means of electrical heating elements wound around the 4 inch jacket surrounding the 2 inch standpipe. Various predetermined loadings of the catalyst into the synthesis gas stream were used and the tendency for variation in loadings for any particular run caused by variation in differential pressure in the reaction zone was minimized by controlling a slide valve, such as valve 51, on the bottom of the standpipe by a conventional differential pressure recorder responsive to the differential pressure between the top and bottom of the standpipe. The differential pressure recorder was set at various readings of inches of water depending upon the catalyst loading desired. The concentration of catalyst in the reaction zone or elongated conduit was determined by the differential pressure in a 15 foot vertical section of the conduit. The overall length of the reaction zone was about 26 feet and 3½ inches, i. e., from the point the catalyst was first contacted with the synthesis gas and the point where the catalyst was separated from the reaction effluent.

The velocity of the gas stream was sufficiently high that the catalyst was entrained in the synthesis gas stream throughout the reaction zone in a continuous phase.

The catalyst in the standpipe was aerated with recycle gas or combined inlet gas in most instances; however, other gases, such as carbon dioxide, hydrogen, and steam could have been used if desired.

Table II

| Run No. | 4 | 7 | 12 | 13 | 15 | 20 |
|---|---|---|---|---|---|---|
| Hours on Run | 16 | 150 | 24 | 22 | 18 | 24 |
| Operating conditions: | | | | | | |
| Pressure, p. s. i. | 80 | 150 | 150 | 150 | 150 | 150 |
| Ratio of Recycle to Fresh Feed | 1.7 | 4.92 | 8.5 | 6.5 | 6.6 | 5.6 |
| Fresh Feed, CF/H | 150 | 251 | 106 | 123 | 127 | 145 |
| Gas Ratio, $H_2:CO$: | | | | | | |
| Fresh Feed | 3 | 3 | 1.4 | 1.4 | 1.4 | 1.4 |
| Inlet to Reaction Zone | | 4.9 | 2.0 | 2.2 | 2.2 | 1.7 |
| Standpipe: | | | | | | |
| Temp., °F. | 598 | 597 | 596 | 597 | 600 | 600 |
| Density, P. C. F. | 103 | 106 | 87 | 82 | 78 | 67 |
| Lin. Velocity, f. p. s. | 0.10 | 0.14 | 0.11 | 0.11 | 0.10 | 0.09 |
| Reaction zone: | | | | | | |
| Aver. Temp., °F., in zone | 594 | 601 | 600 | 604 | 602 | 590 |
| Gas Inlet Temp., °F. | 604 | 576 | 600 | 600 | 600 | 450 |
| Lin. Velocity, f. p. s. (Superficial) | 7 | 14.3 | 10.5 | 10.4 | 10.3 | 8.9 |
| Catalyst Loading (inches of water) | 53 | 70 | 70 | 70 | 80 | 59 |
| Concentration of Catalyst, p. c. f. | 3.5 | 8.4 | 8.7 | 9.4 | 11.2 | 8.7 |
| Results: | | | | | | |
| Contraction, per cent | 26 | 35 | 35 | 46 | 43 | 49 |
| CO Disappearance | 67 | 58 | 71 | 74 | 83 | 79 |
| Observed Oil, cc./m.³ of fresh feed | 28 | 38 | 101 | 80 | 80 | 69 |
| Water, cc./m.³ of fresh feed | 81 | 135 | 165 | 142 | 129 | 121 |
| Selectivity, $CO \to CO_2$, per cent | 22.4 | 13.2 | 23.2 | 23.2 | 11 | 20.0 |
| $CO \to CH_4$ | | | 18 | 14.5 | 17.8 | 7.4 |

From the above data it is apparent that the product and results in general compare favorably with fluid-bed operations using a conventional dense phase of catalyst.

When operating at 1.4 ratio of hydrogen to carbon monoxide in the fresh feed as in runs 13, 15 and 20, with a recycle ratio of about 5:1 to 6:1 the combined gas inlet composition (including fresh feed and recycle gas) was about 18 per cent carbon monoxide and a ratio of $H_2:CO$ of about 2:1 to 2.5:1 existed in the reaction zone.

In run No. 20 the selectivity appeared to be good with about 20 per cent $CO \to CO_2$ and about 8 per cent of $CO \to CH_4$. Analysis of the product of run 20 indicated that about 40 per cent of the condensed oil comprised oxygenated compounds of which 15 per cent were acids. The water contained about 14 per cent chemicals, approximately half of which were acids. A yield of about 40 cc./m.³ of fresh feed gas of total oxygenated compounds was obtained.

Operations at 250 pounds per square inch pressure have proved to be successful with results somewhat similar to those at lower pressures.

Prior to run 12 an iron catalyst similar to that previously described, but which had been used in conventional dense-phase, fluid-bed operation for about 400 hours, was substituted for the original catalyst in carrying out the process. The composition of this catalyst prior to use in the process is shown in column 1 of Table III. After the catalyst had been used for a period of two days, five days, and nine days, analysis of the catalyst was made to determine the effect of this type of reaction on the carbon and oil content of the catalyst, and also upon the catalyst size. This data is shown in Table III.

Table III

CATALYST ANALYSIS

| Chemical Analysis | Charge | 2 days | 5 days | 9 days |
|---|---|---|---|---|
| Oil + Wax | 4.0 | 4.5 | 5.5 | 5.2 |
| Carbon | 23.1 | 23.5 | 25.4 | 24.0 |
| Total Iron | 65.3 | 65.2 | 63.4 | 62.0 |

| Roller Analysis | Weight per cent | | |
|---|---|---|---|
| 0–10 Microns | 0.9 | 1.0 | 1.2 |
| 10–20 Microns | 0.9 | 2.8 | 2.7 |
| 20–40 Microns | 7.5 | 10.2 | 12.9 |
| 40–80 Microns | 32.4 | 33.3 | 38.4 |
| 80+ Microns | 53.3 | 32.7 | 44.8 |
| Density | 3.4 | 3.1 | 3.2 |

The data of Table III indicates only a slight change in chemical composition and size of the catalyst from the original material introduced at the beginning of run 12. The wax (heavy organic compounds) content increased about 1.5 per cent and the fixed carbon content increased about 2.3 per cent. A decrease of less than 2 per cent in the total iron was noted. The particle size analysis indicates that the catalyst became slightly finer on use. From these results the catalyst composition in the circulating system of the present invention was probably more stable than with the conventional dense-phase operation using a fluid-bed.

Having described our invention, we claim:

1. A process for the hydrogenation of carbon monoxide which comprises continuously passing a gaseous mixture comprising hydrogen and carbon monoxide in a mol ratio of at least about 1:1 upward through a plurality of alternate uncooled and cooled reaction zones, continuously introducing a finely divided hydrogenation catalyst into said gaseous mixture, maintaining a temperature and pressure of reaction between about 300° F. and about 750° F. and between about atmospheric and about 500 pounds per square inch gage, maintaining a linear gas velocity in said reaction zones of at least 6 feet per second such that the heaviest catalyst particles continuously move in the direction of flow of the gases whereby the residence time of the catalyst in the reaction zones is relatively short, subsequently separating catalyst from a reaction effluent, stripping the separated catalyst of heavy organic compounds deposited thereon during the hydrogenation of carbon monoxide, and recycling stripped catalyst without further regeneration as substantially the sole source of catalyst for said hydrogenation reaction.

2. A process for the hydrogenation of carbon monoxide which comprises continuously passing a gaseous mixture comprising hydrogen and carbon monoxide in a mol ratio of at least about 1:1 through a plurality of alternate uncooled and cooled reaction zones, continuously introducing a finely divided hydrogenation catalyst into said gaseous mixture, maintaining a temperature and pressure of reaction between about 300° F. and about 750° F. and between about atmospheric and about 500 pounds per square inch gage, maintaining a linear gas velocity in said reaction zones such that the heaviest catalyst particles continuously move in the direction of flow of the gases whereby the residence time of the catalyst in the reaction zones is relatively short, subsequently separating catalyst from a reaction effluent, stripping the separated catalyst of heavy organic compounds deposited thereon during the hydrogenation of carbon monoxide, and recycling stripped catalyst without further regeneration.

3. A process for the hydrogenation of a carbon oxide which comprises continuously passing a gaseous mixture comprising hydrogen and a carbon oxide through a plurality of alternate uncooled and cooled reaction zones, continuously introducing a finely divided hydrogenation catalyst into said gaseous mixture, maintaining a temperature of reaction between about 300 and about 750° F. and a superatmospheric pressure, maintaining a linear gas velocity in said reaction zones of at least 6 feet per second such that the heaviest catalyst particles continuously move in the direction of flow of the gases whereby the residence time of the catalyst in the reaction zones is relatively short, separating catalyst from a reaction effluent, stripping the catalyst of heavy organic compounds deposited thereon during the hydrogenation of the carbon oxide, and recycling stripped catalyst.

4. A process for the hydrogenation of a carbon oxide which comprises continuously passing a gaseous mixture comprising hydrogen and a carbon oxide through a plurality of alternate uncooled and cooled reaction zones, continuously introducing a finely divided hydrogenation catalyst into said gaseous mixture, maintaining a temperature of reaction between about 300 and about 750° F., maintaining a linear gas velocity in said reaction zones such that the heaviest catalyst particles continuously move in the direction of flow of the gases whereby the residence time of the catalyst in the reaction zones is relatively short, maintaining the residence time of said catalyst and said gaseous mixture between the point of introduction of catalyst and the inlet to the first of said cooled zones such that the temperature of reaction will not rise above the desired value within the above temperature range, separating catalyst from a reaction effluent, stripping the catalyst of heavy organic compounds deposited thereon during the hydrogenation of the carbon oxide, and recycling the stripped catalyst.

5. A process for the hydrogenation of a carbon oxide which comprises passing a gaseous mixture comprising hydrogen and carbon oxide through a plurality of alternate uncooled and cooled reaction zones under exothermic conditions of reaction such that organic compounds are produced, continuously introducing a finely-divided catalyst into said gaseous mixture, maintaining a temperature of reaction between about 300 and about 750° F. and a superatmospheric pressure, maintaining a linear gas velocity in said reaction zones such that heaviest catalyst articles continuously move in the direction of flow of the gases whereby the residence time of the catalyst in the reaction zones is relatively short, maintaining the outlet temperature from the last of said cooled reaction zones at a lower temperature than the outlet temperature of any previous cooled reaction zone, subsequently separating catalyst from a reaction effluent, recycling catalyst thus separated through an aerated passageway to said gaseous feed mixture.

6. A process for the hydrogenation of a carbon oxide which comprises continuously passing a gaseous mixture comprising hydrogen and a carbon oxide through a plurality of alternate uncooled and cooled reaction zones under exothermic conditions of reaction such that organic compounds are produced, continuously introducing a finely-divided catalyst into said gaseous mixture, maintaining a temperature of reaction between about 300 and about 750° F. and a superatmospheric pressure, maintaining a linear gas velocity in said reaction zones such that the heaviest catalyst particles continuously move in the direction of flow of the gases whereby the residence time of the catalyst in the reaction zones is relatively short, introducing a gas containing hydrogen into at least one of said uncooled reaction zones subsequent to the cooled reaction zone, subsequently separating catalyst from a reaction effluent and recycling catalyst thus separated to said gaseous feed mixture through an aerated passageway.

7. The process of claim 6 in which said gas containing hydrogen injected into said uncooled reaction zone comprises cold synthesis feed gas.

8. The process of claim 6 in which said gas containing hydrogen introduced into said uncooled reaction zone comprises cold recycle gas.

9. A process for the hydrogenation of carbon monoxide which comprises continuously passing a gaseous mixture comprising hydrogen and carbon monoxide through a confined passageway to a reaction zone in which the reactants are converted to organic compounds under exothermic conditions of reaction, continuously introducing a finely-divided metal hydrogenation catalyst comprising iron into said confined passageway, maintaining the linear gas velocity of gases in said confined passageway leading to said reaction zone sufficiently high such that catalyst is entrained in the gases and passed through said passageway at substantially the same linear velocity as the gases whereby the catalyst and reactants are intimately mixed and the gases achieve substantially the theoretical mixing temperature upon contact with the catalyst, passing the gases and catalyst upward through said reaction zone at a sufficient linear velocity such that the heaviest catalyst particles continuously move in the direction of flow of the gases whereby the residence time of the catalyst in the reaction zone is relatively short, maintaining a temperature between about 550 and about 650° F. positively cooling said reaction zone at spaced intervals to maintain a temperature of reaction within the above range, subsequently separating catalyst from a reaction effluent, and recycling catalyst thus separated to said confined passageway leading to said reaction zone.

10. The process of claim 9 in which fresh catalyst is introduced into said confined passageway leading to said reaction zone in an amount sufficient to make up for the loss of any catalyst with the reaction effluent.

11. The process of claim 9 in which the linear gas velocity of the gases in said confined passageway leading to said reaction zone is at least 28 feet per second and the residence time of catalyst and gases between the point of introduction of catalyst into said confined passageway and the inlet to the first cooled portion of said reaction zone is less than about two seconds.

12. A process for the hydrogenation of carbon monoxide to produce organic compounds having more than one carbon atom per molecule which comprises introducing a finely-divided hydrogenation catalyst comprising iron and an alkali as a promoter and a gaseous mixture comprising hydrogen and carbon monoxide in a mol ratio of at least 1:1 into the lower portion of an elongated reaction zone, passing gases upward through said elongated reaction zone at a linear velocity of at least about 6 feet per second to suspend said catalyst in the gases such that the concentration of catalyst in gases is relatively small and such that finely-divided catalyst moves in the direction of flow of said gases in said elongated reaction zone, maintaining a temperature of reaction between about 550 and about 650° F. and a pressure between about 10 and about 500 pounds per square inch gage such that a major proportion of the carbon monoxide is converted, controlling the temperature of reaction within the above relatively narrow range by positively cooling said elongated reaction zone at spaced intervals by indirect heat exchange with a cooling medium, removing from the upper portion of said elongated reaction zone a gaseous effluent containing finely-divided catalyst and passing same to a separation zone in which catalyst is separated from gases, recovering organic compounds having more than one carbon atom per molecule from the effluent as products of the process, withdrawing catalyst from said separation zone, treating the catalyst thus withdrawn with a hydrogen containing gas, and returning catalyst thus separated and hydrogen treated to said elongated reaction zone.

13. A process for the hydrogenation of carbon monoxide to produce organic compounds having more than one carbon atom per molecule which comprises introducing a finely-divided metal hydrogenation catalyst and a gaseous mixture comprising hydrogen and carbon monoxide into the lower portion of an elongated reaction zone, passing gases upward through said elongated reaction zone at a sufficient linear gas velocity such that the heaviest catalyst particles move in the direction of flow of the gases whereby the residence time of the catalyst in the reaction zone is relatively short, maintaining a reaction temperature between about 300 and about 750° F. and a superatmospheric pressure such that carbon monoxide and hydrogen are converted to organic compounds, maintaining the temperature of reaction in said reaction zone within a relatively narrow range of about 100° F. by positively cooling said reaction zone at spaced intervals, passing from the upper portion of said elongated reaction zone a gaseous effluent containing finely-divided metal hydrogenation catalyst to a separation zone in which finely-divided catalyst is separated from gases, recovering from said effluent organic compounds having more than one carbon atom per molecule as products of the process, withdrawing catalyst from said separation zone and recirculating separated catalyst to said elongated reaction zone.

14. A process for the hydrogenation of a carbon oxide which comprises passing a gaseous mixture comprising hydrogen and a carbon oxide through an elongated reaction zone having a plurality of independently and separately cooled successive reaction sections under exothermic conditions of reaction such that organic compounds are produced, continuously introducing a finely divided catalyst into said gaseous mixture, maintaining a temperature of reaction between about 300° F. and about 750° F. and a superatmospheric pressure, passing gases through said elongated reaction zone at a sufficient linear gas velocity such that the heaviest catalyst particles move in the direction of flow of the gases, subsequently separating catalyst from a reaction effluent, recycling catalyst thus separated to said elongated reaction zone and recovering from said effluent organic compounds as products of the process.

15. A process for the hydrogenation of carbon monoxide to produce organic compounds having more than one carbon atom per molecule which comprises introducing a finely divided hydrogenation catalyst comprising iron and a gaseous mixture comprising hydrogen and carbon monoxide into the lower portion of an elongated reaction zone having a plurality of independently and separately cooled successive reaction sections, passing gases upward through said elongated reaction zone at a sufficient linear gas velocity such that the heaviest catalyst particles move in the direction of flow of the gases whereby the residence time of the catalyst in the reaction zone is relatively short, maintaining a reaction temperature between about 300° F. and about 750° F. and a superatmospheric pressure such that carbon monoxide and hydrogen are converted to organic compounds, passing from the upper portion of said elongated reaction zone a gaseous effluent containing finely divided metal hydrogenation catalyst to a separation zone in which finely divided catalyst is separated from gases recovering from said effluent organic compounds having more than one carbon atom per molecule as products of the process, withdrawing catalyst from said separation zone and recycling separated catalyst to said elongated reaction zone.

JOSEPH W. JEWELL.
WILLIAM B. JOHNSON.

(References on following page)

REFERENCES CITED

The following references are of record in the file of this patent:

UNITED STATES PATENTS

| Number | Name | Date |
|---|---|---|
| 2,238,240 | Wirth | Apr. 15, 1941 |
| 2,266,161 | Campbell | Dec. 16, 1941 |
| 2,320,273 | Gohr et al. | May 25, 1943 |
| 2,326,438 | Clarke | Aug. 10, 1943 |
| 2,347,682 | Gunness | May 2, 1944 |
| 2,389,931 | Reed et al. | Nov. 27, 1945 |
| 2,464,505 | Hemminger | Mar. 15, 1949 |